United States Patent [19]

Van Dyke et al.

[11] Patent Number: 5,326,603
[45] Date of Patent: Jul. 5, 1994

[54] HOLLOW TUBE COMPONENT FOR A DISPENSING APPLICATOR

[75] Inventors: Darrell W. Van Dyke, Liberty; John P. Rowe, Antioch, both of Ill.

[73] Assignee: Gam-Med Packaging Corporation, Antioch, Ill.

[21] Appl. No.: 1,503

[22] Filed: Jan. 6, 1993

Related U.S. Application Data

[62] Division of Ser. No. 807,220, Dec. 16, 1991, Pat. No. 5,229,061.

[51] Int. Cl.$^5$ ............................................ B29D 22/00
[52] U.S. Cl. .................................. 428/35.7; 428/36.9; 428/36.92; 428/213
[58] Field of Search ............... 428/35.7, 36.9, 36.92, 428/213

[56] References Cited

U.S. PATENT DOCUMENTS

| | | | |
|---|---|---|---|
| 2,337,116 | 12/1943 | Limbert | 264/303 |
| 2,786,238 | 3/1957 | Shapero | 264/303 |
| 2,830,325 | 4/1958 | Bray | 264/303 |
| 2,966,703 | 1/1961 | Harman | 264/279 |
| 2,983,959 | 5/1961 | Shapero | 264/303 |
| 3,002,231 | 10/1961 | Walker | 264/DIG. 51 |
| 3,906,071 | 9/1975 | Cook | 264/303 |
| 3,927,161 | 12/1975 | Powell | 264/DIG. 51 |
| 4,138,132 | 2/1979 | Doyle | 425/275 |
| 4,434,126 | 2/1984 | McGary, Jr. | 264/DIG. 51 |
| 4,552,715 | 11/1985 | Ando | 264/DIG. 51 |
| 4,695,241 | 9/1987 | Ventimiglia | 425/275 |
| 4,874,373 | 10/1989 | Luther | 264/301 |
| 4,878,827 | 11/1989 | Muller | 249/52 |
| 4,992,037 | 2/1991 | Hwang | 264/303 |
| 5,065,913 | 11/1991 | Glasener | 425/275 |

FOREIGN PATENT DOCUMENTS

| | | | |
|---|---|---|---|
| 1359843 | 3/1963 | France | 264/DIG. 51 |
| 0627144 | 8/1978 | U.S.S.R. | 264/301 |

*Primary Examiner*—Jenna L. Davis
*Attorney, Agent, or Firm*—Y. Judd Azulay

[57] ABSTRACT

A mold for use in producing a hollow tube component for a dispensing applicator. The mold has a main body portion that defines a forward end from which extends a sloped shoulder portion, a neck portion, and a stem element. Between the stem element and the neck portion, there is a provided a re-entrant surface which forms a sharp edge and an angle with respect to the outer, main surface of the neck portion. The mold is used in a dip-molding process for producing a dispensing container that has a frangible portion that is broken away during first use, which frangible portion is formed by the re-entrant surface.

6 Claims, 2 Drawing Sheets

5,326,603

HOLLOW TUBE COMPONENT FOR A DISPENSING APPLICATOR

This is a divisional of copending application Ser. No. 07/807,220 filed on Dec. 16, 1991, now U.S. Pat. No. 5,229,061.

FIELD OF THE INVENTION

This invention generally relates to the art of molding a hollow plastic tube used to hold chemicals for topical application to the human body where the tube has a frangible portion which can be readily broken.

BACKGROUND OF THE INVENTION

Applicators consisting of a wooden or plastic tube, having a bud of cotton on one or both ends, are widely used for numerous purposes, such as for the topical application of substances to the human body. A demand exists for an article of this kind which serves not only as the applicator, but also as the container for the substance that is to be applied. To be practical, such a device would have to have a manually frangible portion that can readily be broken, while at the same time being so constructed as to prevent inadvertent fracture. An applicator of this nature would be useful for numerous purposes in addition to the personal cosmetic and medical applications alluded to.

Accordingly, it is a broad object of the present invention to produce inexpensively and efficiently provide a novel applicator consisting of a plastic tube component with a permeable member attached to one end, the tube being hollow, to adapt it for the containment of a substance to be dispensed, and having a frangible portion under the permeable member that can be broken to form a flow orifice, when desired.

It is a more specific object of the invention to provide such an applicator and tube component in which the level of force necessary to effect fracturing of the frangible portion is controlled so as to resist inadvertent breakage while, at the same time, permitting the fracture to occur at a convenient level of manual force.

Other objects of the invention are to provide a novel mold for producing the tube component, and a novel method, utilizing the mold, in which the tube component can be produced conveniently and inexpensively, and at high rates of speed, while also ensuring that the ultimate article will exhibit the desired functional characteristics.

SUMMARY OF THE INVENTION

It has now been found that certain of the foregoing and related objects of the invention are attained by the novel mold and method of producing an applicator comprising a hollow tube component and a liquid-permeable member. The tube component is integrally formed, as a single piece, from a relatively rigid synthetic resinous material. It includes a body portion containing a flowable substance within its cavity, which is sealed at one end, and has a frangible portion at its other end, to which the permeable member is attached. The frangible portion comprises a support element, through which extends a passageway connected at one end to the body portion cavity. A relatively rigid stem element extends outwardly of the support element, and a connecting element connects the base of the stem element and the outer end of the support element. The connecting element is strongly and rigidly Joined to the base of the stem element, and has a circumferential zone of weakness adjacent its Juncture with the other end of the tubular element. By deflecting the stem element relative to the tubular element, with a force of substantially predetermined magnitude, the frangible portion will fracture within the zone of weakness, permitting the substance to flow from the body portion cavity, through the orifice that is formed at the juncture and into the attached permeable member.

The body portion is cylindrical having a cross section substantially greater than the cross section of the frangible portion. The tube component may additionally include a hollow portion interposed, and providing a passage, between the body portion and the frangible portion.

In the preferred embodiment, the inner surface of the connecting element will join the inside surface of the forward stem portion at a sharp angle of about 65 to 90 degrees, to provide a weakened wall portion or break zone. The dimension of the elements of the frangible portion, and the thickness of the synthetic resinous material thereat, will most desirably be such that the stem element will not flex substantially with respect to the body portion element, and that the frangible portion will fracture within the break zone under a force of about 0.25 to 5.0 pounds depending upon the angle of the break zone and the thickness of the material.

The wall of the body portion will normally be sufficiently thin and flexible to permit it to be resiliently compressed by the application of manual force thereupon. More particularly, in the preferred embodiment the wall thicknesses of the body portion, and of the frangible portion, will both be within the range of about 0.008 to 0.025 inches, the body portion will have an inside diameter of about 0.250 to 1.00 inches and will be about 2.5 to 8.00 inches in length. The frangible portion will have a length of about 0.200 to 1.000 inches and will be about 0.750 to 1.000 inches in depth, the stem element will be about 0.250 to 0.750 inches in length and will be about 0.750 inches wide. The differential between the inside dimension of the neck element and the outside dimension of the stem element will most desirably be about 0.030 to 0.050 inches.

Although other polymers can be used, the tube will desirably be fabricated from polypropylene, high density polyethylene, nylon or rigid polyvinyl chloride; the liquid-permeable member will normally be a bud of either cotton or of an open-cell, pliant foamed synthetic resinous material.

Additional objects are attained by the provision of a hollow tube, adapted for use as a component of an applicator or like article and having the features hereinabove described.

Other objects are realized by the provision of a mold for producing the tube component, which comprises a one-piece rectilinear member including a body portion of relatively large cross section at one end, a tip portion of relatively small cross section and having a sharp outer edge at the other end, and a stem element extending outwardly from the sharp outer edge. The stem element and neck portion of the mold are Joined by a continuous surface extending from the outer edge of the tip portion to the base of the stem element, with the stem element base forming an angle with said surface of about 65 to 90 degrees. The mold is made from a smooth-surfaced metal having a relatively high heat capacity and coefficient of thermal conductivity, and it is adapted for use in a dip-molding process utilizing a particulate, fusible synthetic resinous material.

Still other objects are attained by the provision of a method for the production of a hollow tube, utilizing a mold member of the construction described. In the method, the mold is heated to the melting temperature of the resinous material, and is immersed into a fluidized bed thereof to develop a coating about 0.008 to 0.025 inches thick over substantially the entire exposed surface. The mold with its coating is removed from the fluidized bed and heated a second time. After this second heating, the coating is cooled. During this cooling step the coating is drawn across the sharp outer edge of the mold creating a substantially thinner wall in the tube component at the outer edge creating a consistently dimensioned thin wall resulting in a weakened section in the tube component. The resulting hollow, self-supporting tube is then stripped from the mold.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the following description taken in conjunction with the accompanying drawings, in which like reference numerals identify like elements in the figures and in which:

DETAILED DESCRIPTION OF THE PREFERRED EMBODIMENT

Figure 1:
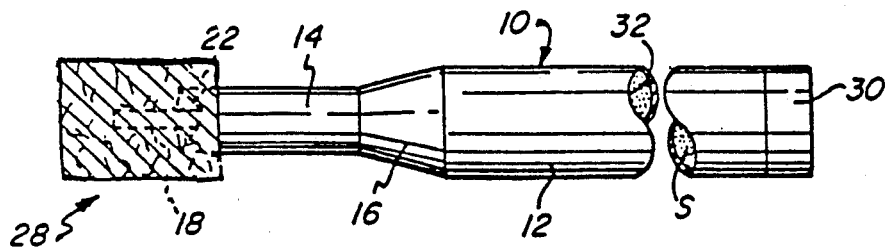
FIG. 1 is a fragmentary elevational view showing an applicator embodying the present invention.
Figure 2:
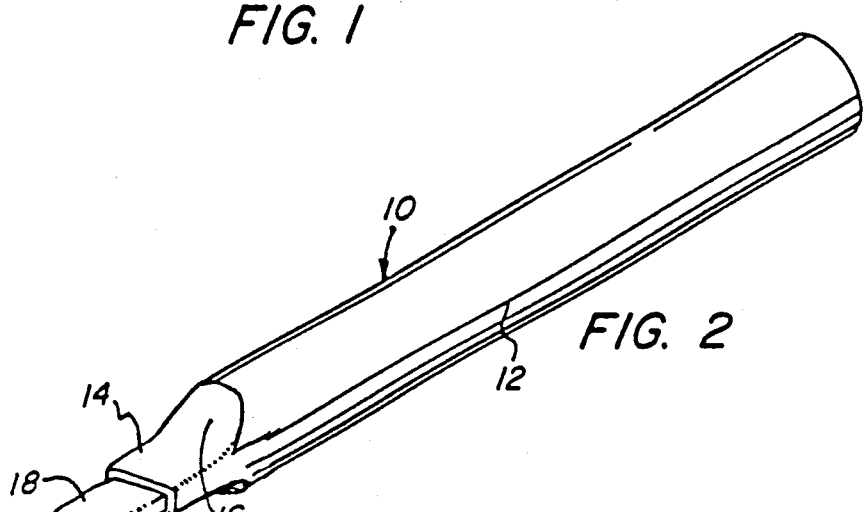
FIG. 2 is a perspective view showing the tube component of the applicator of FIG. 1.
Figure 5:
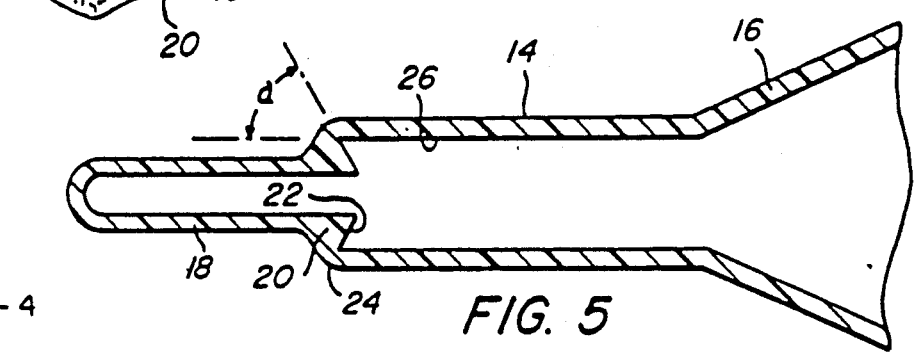
FIG. 5 is a sectional view of the tip end of the tube, drawn to a scale greatly enlarged from that of FIG. 4.
Figure 3:
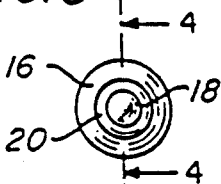
FIG. 3 is a tip end view of the tube of FIG. 2.
Figure 4:
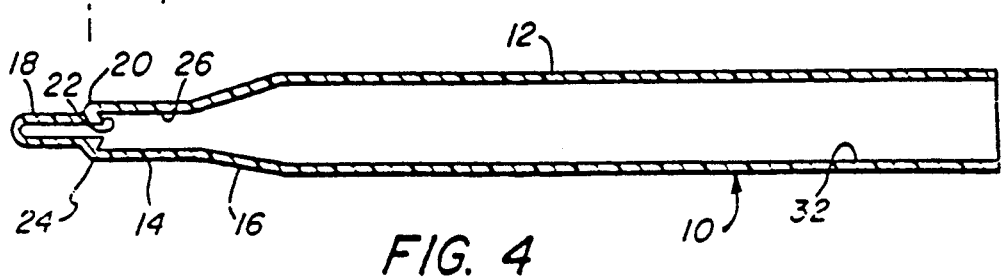
FIG. 4 is a sectional view (although left free of cross-hatching, for clarity of illustration) of the tube, taken along line 4—4 of FIG. 3.

Turning now to FIGS. 1–5 of the drawings, therein illustrated is an applicator embodying the invention and the plastic tube component of which it is comprised, the latter being generally designated by the numeral 10 and consisting of hollow generally cylindrical body portion 12 and a coaxial neck portion 14, joined thereto by an outwardly tapered transition shoulder portion 16. A hollow flattened stem element 18, which is closed at its tip, extends coaxially from the neck portion 14 a substantial distance beyond the base section 20 which connects the stem 18 to the neck 14. The base section 20 has a nonuniform cross section with an inwardly tapered inside surface 22 thereon. It will be noted that the base section 20 is relatively thick adjacent the stem element 18, and that it tapers to a thin zone 24 adjacent the neck portion 14, by virtue of the relatively sharp angle "a" formed between the base interior surface 22 and the inside surface 26 of the neck portion 14.

The applicator also includes a cotton bud or sponge generally designated by the numeral 28, applied over the frangible end of the tube 10. The opposite end of the body portion 12 is sealed at 30, such as by heat sealing, to enclose the substance "S" contained within the body cavity 32.

The manner of utilizing the applicator will be self-evident, and simply involves holding the tip 18 with the bud or sponge 28 against a surface at roughly a 45 degree angle downward pressure which will deflect the stem element 18 from the axis of the tube 10 and relative to the neck portion 14, with a force sufficient to fracture the material at the break zone 24. This break zone represents the thinnest molded wall section. Fracture of the break zone 24 will desirably be achieved by the application of approximately 0.25 to 5 pounds of force.

Because of the outwardly tapered profile of the base section 20, and the resultant strength gradient, there will be virtually no deflection at the base of the stem element 18 and the applied force will be effectively transferred to and concentrated at the juncture of the section 20 with the neck portion 14. The result will be the reliable formation of an elongated orifice of suitable size to permit the substance "S" within the body 12 to be discharged therethrough and into the cotton bud or sponge 28. As noted above, it will generally be desirable for the material of the body portion 12 to be sufficiently thin to permit some compression, so as to enable discharge of a liquid at a faster rate than would otherwise occur, and/or to promote the flow of a relatively viscous material.

To ensure proper functioning of the frangible portion, the inside surface 22 of the base section 20 will preferably form an angle "a" of about 65 to 90 degrees with respect to the surface 26 of the neck portion 14. The preferred dimensions for the several portions of the tube component have previously been given. In its most desirable form, virtually all portions of the tube, other than the connecting base section 20, will have a wall thickness which is substantially uniform at a value of about 0.005 to 0.025 inches, and the material will desirably have a thickness of about 0.0005 to 0.002 inches in the thinnest part of the break zone 24.

In a specific embodiment, the tube is made of polypropylene having a density of 0.897 grams per cubic centimeter and a flexural modulus of about (MPA) 150,000 psi, as determined by ASTM method 790B; it has the configuration shown in FIGS. 1 to 5, and is 2 to 10 inches in overall length. The body 12 is about 6 to 8 inches long and 0.25 to 1.0 inches in diameter, the conical shoulder portion 16 is about 0.25 to 1.25 inches long and forms an angle of about 20 to 45 degrees to the longitudinal axis, the neck portion 14 is about 0.25 to 0.625 inches long and 0.325 inches in diameter. The polypropylene is about 0.008 to 0.025 inches thick in all areas except the weakened zone 24, where it is about 0.0005 to 0.002 inches thick, and is, of course, pinhole-free throughout; the angle "a" has a value of about 80 degrees. The fracture of the break zone 24 produces an elongated orifice about the same size as the inside diameter of the neck portion 14 and requires a force of about 0.25 to 5 pounds.

Figure 6:
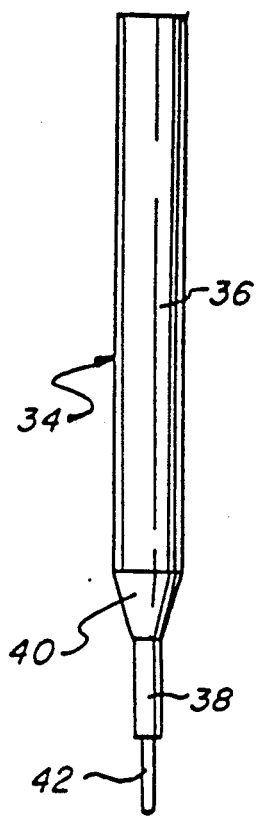
FIG. 6 is an elevational view of the mold used to produce the tube of the foregoing figures.
Figure 7:
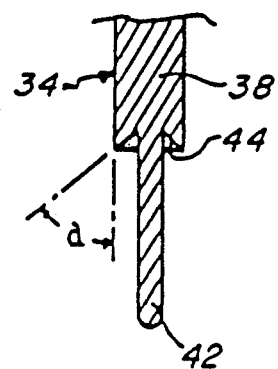
FIG. 7 is a fragmentary cross-sectional view of the tip end of the mold of FIG. 6, taken along the longitudinal axis thereof and drawn to an enlarged scale.

Turning now to FIGS. 6 and 7, the mold member, generally designated by the numeral 34, utilized to produce the tube component 10 conforms closely thereto and consequently need not be discussed in great detail. It is made of cold finished steel bar stock, polished to removed imperfections, and has a body portion 36, a neck portion 38 and a shoulder portion 40, with a stem element 42 extending coaxially from the neck portion 38. A re-entrant surface 44 is present on the mold between the stem element 42 and the neck portion 38, which forms a sharp edge and an angle "a" with the surface of the neck portion 38 to produce the same angle in the tube 10 subject to the minor effects of the slight shrinkage that will occur during hardening of the resin.

The shoulder section or portion 40 has a rear end-portion connected to the forward end-portion of the main body portion 36. The shoulder section also has a forward end-portion connected to the rear end-portion of the neck section or portion 38, while the neck section 38 has a forward end-portion connected to the rear end-portion of stem-element section or portion 42. The sections or portions 36, 38, 40 and 42 have a common, colinear, central, longitudinal axis. The re-entrant section or portion 44 is a sloping, straight-line, re-entrant surface connecting the forward end-portion of the neck section 38 to the rear end-portion of the stem-element section 42. The angle "a" of the re-entrant surface forms between 65 and 90 degrees with respect to the common, colinar, central longitudinal axis, with the re-entrant surface sloping such that the first end thereof is forward of the second end thereof, whereby the forward end-portion of the neck section 38 overlaps the rear end-portion of the stem-element section 42. The re-entrant surface actually comprises a first re-entrant straight-line surface-portion and a second re-entrant straight-line surface-portion, with the first re-entrant surface-portion extending above the central longitudinal axis, and the second re-entrant surface-portion extending below the central longitudinal axis. Each of the neck section 38 and the stem-element section 42 has a rectangular-shaped cross section. The body portion 36 has a cross section greater than the cross section of the frusto-conical shaped shoulder section 40, except for the rear end-portion of the shoulder section which is connected to the forward end-portion of the body portion 36. The shoulder section or portion 40 has a cross section greater than the cross sections of the neck section 38 and the stem-element section 42, except for the rear end-portion of the neck section 38 which is connected to the forward end-portion of the shoulder portion, as clearly seen in FIG. 6, for allowing for the stripping from the mold. When the mold 34 is used, the re-entrant surface 44 causes a substantially triangular-shaped filling between the re-entrant surface, the forward end-portion of the neck section 38, and the rear end-portion of the stem-element section 42, with the material filling the space defined between the overlapping of the neck section 38 with the stem-element section 42.

The dip molding process begins with preheating of a male mold made from a material having relatively high heat capacity and coefficient of thermal conductivity. This heated mold is then placed in a fluidized bed of meltable particulate resinous material for a time needed to provide a coating of a desired thickness. The mold with melted resinous material is then removed from the fluidized bed, heated a second time and cooled. Finally the tube component is stripped from the mold.

As noted above, it is important for the proper functioning of the applicator that the tube be fabricated from a material that is sufficiently rigid to enable manual fracture of the frangible end portion. If the material is too flexible, deflection of the stem will not produce the desired result. On the other hand, if the material is excessively rigid and brittle, the possibility of an inadvertent fracture will exist, and compression of the body portion to promote flow would be precluded due to the likelihood of cracking, or simply because too much force is required. A variety of synthetic resinous materials may be utilized, the selection of which will be evident to those skilled in the art. The resin must have a sufficiently low melt viscosity to permit coverage of all mold surfaces, and it must produce a nonporous and pinhole-free structure. The polymer will normally be a thermoplastic, and exemplary materials include polypropylene, high density polyethylene, rigid polyvinyl chloride and nylon.

The tip portion of the tube will normally be a flattened hollow tongue to facilitate attachment of the porous bud or sponge. However, it is not essential that the tip be of that shape and, for example, could instead be cylindrical. As indicated, the porous member may be made of other materials, most notably an open cell, soft and pliant sponge-like foam, as may for example be of a polyurethane composition. The choice of material will depend largely upon the application for which the applicator is intended and, more particularly, upon the composition and viscosity of the liquid or other flowable substance contained within the internal reservoir.

In its normal form, the applicator tube will be about 2.5 to 8 inches in overall length, and of circular cross section in the hollow body portion and of rectangular cross section at the neck and stem portions in all planes transverse to the tubes longitudinal axis. However, other shapes are also believed to be feasible. The tube components may have a circular or square cross section, and the shape may indeed be asymmetrical in cross section and of dissimilar shapes at different points along its length. It will be appreciated therefore that, as used herein the term "diameter" is to be construed in a broad sense, so as to be applicable to non-circular elements corresponding to those shown, and to refer to the maximum cross-sectional dimension of the element. Although the stem portion will normally be hollow, and will necessarily be so when the method of the invention is carried out in a normal manner, a solid stem may be advantageous from the standpoint of permitting adequate rigidity in a thinner section than would otherwise be possible.

As indicated above, the invention will be used to make an article which will be employed as an applicator for the application of liquids to the body (e.g., for medicinal, disinfectant, and cleaning purposes). However, a wide variety of nonpersonal applications will also occur to those skilled in the art. For example, the tube can be employed as a component of an applicator for a lubricant or an adhesive. The range of sizes can also vary widely, as long as the several wall thicknesses are controlled appropriately to afford the desired functional characteristics discussed herein.

Thus, it can be seen that the present invention provides a novel applicator consisting of a plastic tube component and a permeable member attached to one end, the tube component being hollow to adapt it for the containment of a substance to be dispensed, and having a frangible portion under the permeable member that can be broken to form a flow orifice, when desired. The level of force necessary to break the frangible portion is so controlled as to resist inadvertent fracture while, at the same time, permitting it to occur at a convenient level of manual force. The invention also provides a novel hollow tube for such an applicator, a novel mold for producing the tube, and a novel method utilizing the mold. The method enables production of the tube at high rates of speed, conveniently and inexpensively, while ensuring that it will exhibit the desired functional characteristics.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

Having thus described the invention, what is claimed is:

1. A hollow dispensing applicator product made by utilizing a mold, said mold comprising:

a one-piece, smooth-surfaced member, said member comprising a main body section having a cross section and having a forward end-portion and a rear end-portion; a shoulder section having a cross section and having a forward end-portion and a rear end-portion, said rear end-portion of said shoulder section extending from said forward end-portion of said main body section; a neck section having a cross section and having a forward end-portion and a rear end-portion, said rear end-portion of said neck section extending from said forward end-portion of said shoulder section; a stem-element section having a cross section and having a forward end-portion and a rear end-portion, said rear end-portion of said stem-element section extending from said forward end-portion of said neck section, said sections having common, colinear, central, longitudinal axes;

and said member comprising a re-entrant section comprising a sloping, straight-line, re-entrant surface connecting said forward end-portion of said neck section to said rear end-portion of said stem-element section; said re-entrant surface having a first end-connected to said forward end-portion of said neck section, and a second end connected to said rear end-portion of said stem-element section; said re-entrant surface forming an angle of between 65 and 90 degrees with respect to said common, colinear, central longitudinal axes, said re-entrant surface sloping such that said first end thereof is forward of said second end, said forward end-portion of said neck section overlapping said rear end-portion of said stem-element section; and said member being made of metal having a high heat capacity and coefficient of thermal conductivity for use in a dip-molding process; said main body portion having a cross section at least one of equal to and greater than the cross sections of said shoulder section, said neck section, and stem-element section for allowing for the stripping from the mold, said hollow dispensing applicator product being made by a method comprising:

(a) providing a fluidized bed of meltable particulate resinous material having a melting temperature;

(b) heating said mold to said melting temperature of said resinous material;

(c) totally immersing said heated mold into said fluidized bed of material to develop a coating over said mold exposed thereto such that said main body portion, said shoulder section, said neck section and said stem-element section are completely immersed in said bed of material;

(d) removing said mold from said bed;

(e) heating said mold with said coating thereon a second time;

(f) cooling said coating on said mold; and (g) stripping said coating from said mold to thus form said hollow dispensing applicator product;

(h) said step (c) comprising exposing said re-entrant surface to said material and causing said material to fill a space defined between said overlapping of said neck section with said stem-element section, and coating said re-entrant surface of said mold with said material, said step of causing the material to fill causing a substantially triangular-shaped filling between said re-entrant surface, said forward end-portion of said neck section, and said rear end-portion of said stem-element section.

2. The product according to claim 1, said hollow dispensing applicator product comprising a one-piece, smooth-surfaced hollow member made of said material of said fluidized bed, said member comprising a main body section having a forward end-portion and a rear end-portion, a shoulder section having a forward end-portion and a rear end-portion, said rear end-portion of said shoulder section extending from said forward end-portion of said main body section; a neck section having a forward end-portion and a rear-end portion, said rear end-portion of said neck section extending from said forward end-portion of said shoulder section, a stem-element section having a forward end-portion and a rear end-portion, said rear end-portion of said stem-element section extending from said forward end-portion of said neck section, each of said sections having a central, longitudinal axis;

and an interior, re-entrant, frangible section comprising a re-entrant, frangible surface connected to both said forward end-portion of said neck section and to said rear end-portion of said stem-element section; said re-entrant surface being a substantially triangular-shaped, solid filling of said material between said forward end-portion of said neck section, and said rear end-portion of said stem-element section; said filling having one leg-surface thereof forming an angle of between 65 and 90 degrees with respect to said central longitudinal axis, said one surface having one end connected to an interior part of said forward-end portion of said neck section and another end extending rearwardly into the hollow interior of said neck section, said another end being positioned rearwardly of said one end, whereby a frangible portion is created at the forward end-portion of said neck section which may be broken away during the first use of the product for allowing dispensing of material contained in said hollow member.

3. A hollow dispensing applicator comprising:

a one-piece, smooth-surfaced hollow member made of plastic material, said member comprising a main body section having a forward end-portion and a rear end-portion, a shoulder section having a forward end-portion and a rear end-portion, said rear end-portion of said shoulder section extending from said forward end-portion of said main body section; a neck section having a forward end-portion and a rear end-portion, said rear end-portion of said neck section extending from said forward end-portion of said shoulder section, a stem-element section having a forward end-portion and a rear end-portion, said rear end-portion of said stem-element section extending from said forward end-portion of said neck section, each of said sections having a central, longitudinal axis;

and an interior, re-entrant, frangible section comprising a re-entrant, frangible surface connected to both said forward end-portion of said neck section and to said rear end-portion of said stem-element section; said re-entrant surface being a substantially triangular-shaped, solid filling of the same material between said forward end-portion of said neck section, and said rear end-portion of said stem-element section; said filling having one leg-surface thereof forming an angle of between 65 and 90 degrees with respect to said central longitudinal axis, said one surface having one end connected to an interior part of said forward-end portion of said neck section and another end extending rearwardly into the hollow interior of said neck section, said another end being positioned rearwardly of said one end, whereby a frangible portion is created at the forward end-portion of said neck section which may be broken away during the first use of the product for allowing dispensing of material contained in said hollow member.

4. The hollow dispensing applicator according to claim 3, further comprising an applicator member over said stem-element; said hollow member having dispensing liquid therein which is dispensed via said applicator member after said frangible section is broken away.

5. The hollow dispensing applicator according to claim 3, wherein said material is plastic.

6. The hollow dispensing applicator according to claim 4, wherein said applicator member is a sponge, said stem-element being received in said sponge.

* * * * *